United States Patent
Rathore et al.

(10) Patent No.: US 10,051,205 B1
(45) Date of Patent: Aug. 14, 2018

(54) DEVICES, SYSTEMS, AND METHODS FOR INSTANT VIDEO SWITCHING IN AN EXTENSION ENVIRONMENT

(71) Applicant: Icron Technologies Corporation, Burnaby (CA)

(72) Inventors: Bhupinder Singh Rathore, Coquitlam (CA); Ardeshir Saghafi, Surrey (CA); Sukhdeep Singh Hundal, Surrey (CA)

(73) Assignee: Icron Technologies Corporation, Burnaby (CA)

( * ) Notice: Subject to any disclaimer, the term of this patent is extended or adjusted under 35 U.S.C. 154(b) by 0 days.

(21) Appl. No.: 15/693,262

(22) Filed: Aug. 31, 2017

(51) Int. Cl.
*H04N 5/268* (2006.01)
*H04N 9/64* (2006.01)

(52) U.S. Cl.
CPC ............. *H04N 5/268* (2013.01); *H04N 9/641* (2013.01)

(58) Field of Classification Search
CPC ...... H04N 5/268; H04N 9/641; G06F 13/385; G06F 13/4045; G06F 2213/0042; G06F 13/4081; G06F 13/4282; G06F 13/4022; Y02B 60/1228; Y02B 60/1235; G09G 2370/12; G09G 5/006; G09G 2370/02
See application file for complete search history.

(56) References Cited

U.S. PATENT DOCUMENTS

| | | | |
|---|---|---|---|
| 2011/0243035 A1* | 10/2011 | Hall | H04L 5/1415 370/276 |
| 2014/0115192 A1* | 4/2014 | Hunkins | G06F 13/24 710/8 |
| 2016/0127671 A1 | 5/2016 | Hundal et al. | |

* cited by examiner

*Primary Examiner* — Michael Teitelbaum
(74) *Attorney, Agent, or Firm* — Christensen O'Connor Johnson Kindness PLLC

(57) ABSTRACT

Extension devices such as upstream facing port devices (UFP devices) and downstream facing port devices (DFP devices) connect via an extension medium. When a UFP device and a DFP device pair with each other, DisplayPort video and/or audio information from a DisplayPort source device can be presented by a DisplayPort sink device, which are coupled to the UFP device and DFP device, respectively. In some embodiments, the DFP device may train a DisplayPort link to the DisplayPort sink device regardless of whether it is receiving actual data from a UFP device, and may provide placeholder data to the DisplayPort sink device in order to keep the link active. The DFP device may then replace the placeholder data with the actual data from the UFP device, once received, and may thereby seamlessly switch the DisplayPort sink device from presenting placeholder data to presenting data from the DisplayPort source device.

4 Claims, 9 Drawing Sheets

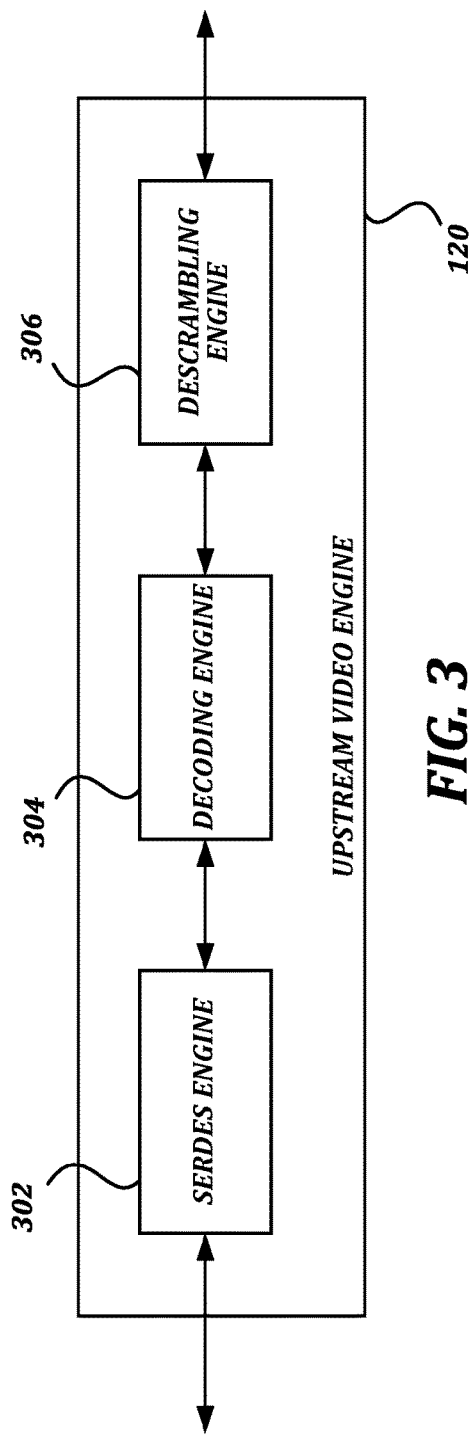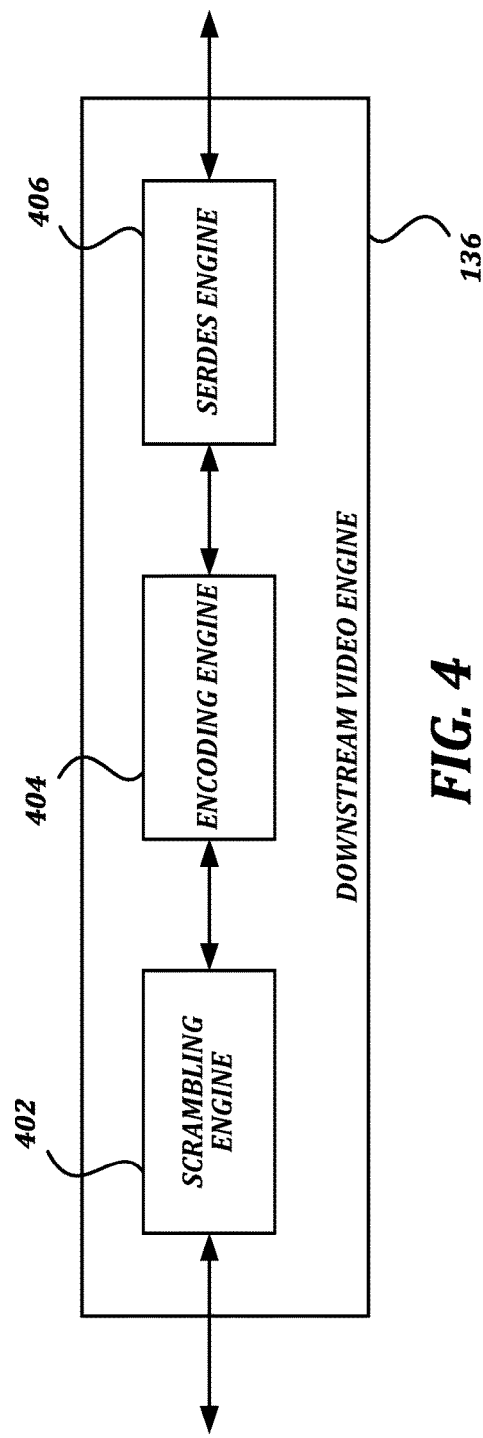

DEVICES, SYSTEMS, AND METHODS FOR INSTANT VIDEO SWITCHING IN AN EXTENSION ENVIRONMENT

BACKGROUND

DisplayPort communication is described in detail at least in "VESA DisplayPort Standard, Version 1.4," released on Mar. 1, 2016, by VESA. This document, the content of which is known to one of ordinary skill in the art, is hereby incorporated by reference herein in its entirety, along with any earlier versions or related documents mentioned therein (collectively hereinafter "the DisplayPort specification"), for all purposes. The DisplayPort specification describes physical and logical techniques for communication between a DisplayPort source device which generates video (and, in some embodiments, audio) and a DisplayPort sink device which presents the video (and, in some embodiments, audio). The DisplayPort specification also describes topologies wherein one or more branch devices (which are similar to repeaters, splitters, or hubs) are present between the DisplayPort source device and the DisplayPort sink device.

The DisplayPort specification includes some limits on the length of a cable connecting the DisplayPort source device and the DisplayPort sink device, and also includes other specific requirements for the physical construction of the cable. For example, full bandwidth transmission over a passive cable is limited to a cable length of three meters. Further, the DisplayPort specification describes direct communication between the DisplayPort source device and the DisplayPort sink device, but does not allow any manipulation of the video or audio content between the DisplayPort source device and the DisplayPort sink device. The DisplayPort specification also assumes that a link is established between a given DisplayPort source device and a given DisplayPort sink device, and that if the given DisplayPort sink device is to link to a different DisplayPort source device, the link will have to be completely retrained.

What is desired are devices and techniques that allow DisplayPort source and sink devices that otherwise comply with the DisplayPort specifications to communicate over an extension medium despite the transmission distance limits and media requirements of the DisplayPort specifications. It is also desired to provide devices and techniques that allow seamless switching between presenting content from a first DisplayPort source device to presenting content from a second DisplayPort source device such that re-training the link to the DisplayPort sink device is not conducted.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system for providing switching of DisplayPort connections is provided. The system comprises an extension medium, a first upstream facing port device (UFP device), and a downstream facing port device (DFP device). The first UFP device is communicatively coupled to a first DisplayPort source device and the extension medium. The DFP device is communicatively coupled to a DisplayPort sink device and the extension medium. The first UFP device is configured to conduct link training with the DisplayPort source device and receive video data from the DisplayPort source device before pairing with the DFP device. The DFP device is configured to conduct link training with the DisplayPort sink device before pairing with the first UFP device; transmit DisplayPort data that includes placeholder video data to the DisplayPort sink device; and, in response to pairing with the first UFP device via the extension medium, switch from transmitting the DisplayPort data that includes the placeholder video data to instead transmitting DisplayPort data that includes video data received from the first UFP device.

In some embodiments, a method of switching DisplayPort connections over an extension medium is provided. An extension device conducts link training with a DisplayPort sink device to establish a DisplayPort link between the extension device and the DisplayPort sink device. The extension device generates placeholder video data. The extension device generates DisplayPort data that includes the placeholder video data. The extension device transmits the DisplayPort data that includes the placeholder video data to the DisplayPort sink device. The extension device receives, via the extension medium, actual video data, wherein the actual video data is generated by a DisplayPort source device. The extension device generates DisplayPort data that includes the actual video data, and transmits the DisplayPort data that includes the actual video data to the DisplayPort sink device without re-training the link between the extension device and the DisplayPort sink device.

In some embodiments, a downstream facing port device (DFP device) is provided. The DFP device comprises an extension interface, a DisplayPort interface, a placeholder video engine, and a downstream video engine. The DisplayPort interface is configured to receive actual video data from the extension interface, wherein the actual video data is generated by a DisplayPort source device. The placeholder video engine is configured to generate placeholder video data. The downstream video engine is configured to conduct link training with a DisplayPort sink device coupled to the DisplayPort interface; transmit DisplayPort data that includes the placeholder video data to the DisplayPort sink device; and switch to transmitting DisplayPort data that includes the actual video data instead of the placeholder video data to the DisplayPort sink device without conducting link training again.

In some embodiments, an upstream facing port device (UFP device) is provided. The UFP device comprises an extension interface, a DisplayPort interface, and an upstream video engine. The upstream video engine is configured to conduct link training with a DisplayPort source device coupled to the DisplayPort interface and receive DisplayPort data from the DisplayPort source device before pairing with a first downstream facing port device (DFP device); receive a first command to pair with the first DFP device; and, in response to pairing with the first DFP device via the extension interface: extract actual video data from the DisplayPort data received from the DisplayPort source device; and transmit the actual video data to the first DFP device via the extension interface.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is a block diagram that illustrates a non-limiting example embodiment of an upstream video engine according to various aspects of the present disclosure;

FIG. 4 is a block diagram that illustrates a non-limiting example embodiment of a downstream video engine according to various aspects of the present disclosure;

DETAILED DESCRIPTION

In some embodiments of the present disclosure, extension devices such as upstream facing port devices (UFP devices) and downstream facing port devices (DFP devices) connect via an extension medium such as a network. UFP devices form DisplayPort connections to DisplayPort source devices, and DFP devices form DisplayPort connections to DisplayPort sink devices. When a UFP device and a DFP device pair with each other, DisplayPort video and/or audio information from the DisplayPort source device can be presented by the DisplayPort sink device which are coupled to the UFP device and DFP device, respectively. In some embodiments of the present disclosure, the DFP device may train a DisplayPort link to the DisplayPort sink device regardless of whether it is receiving actual data from a UFP device, and may provide placeholder data to the DisplayPort sink device in order to keep the link active. The DFP device may then replace the placeholder data with the actual data from the UFP device, once obtained, and may thereby seamlessly switch the DisplayPort sink device from presenting placeholder data to presenting actual data from the DisplayPort source device. In some embodiments, the DFP device may use similar placeholder functionality while changing its pairing to a new UFP device, thereby seamlessly switching the DisplayPort sink device to present data from a new DisplayPort source device.

Figure 1A:
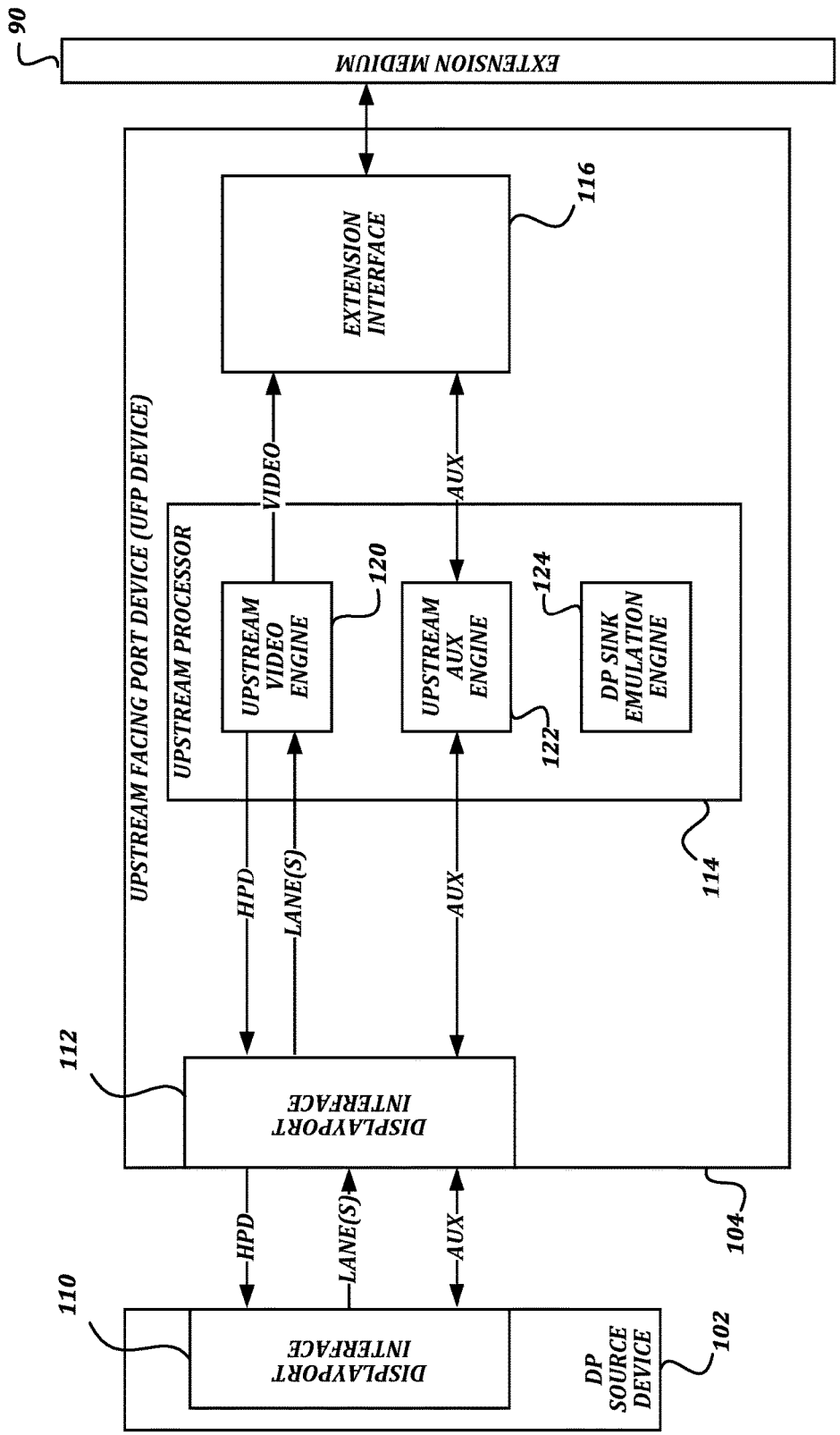
FIGS. 1A and 1B are block diagrams that respectively illustrate non-limiting example embodiments of an upstream facing port device (UFP device) and a downstream facing port device (DFP device) according to various aspects of the present disclosure.
Figure 1B:
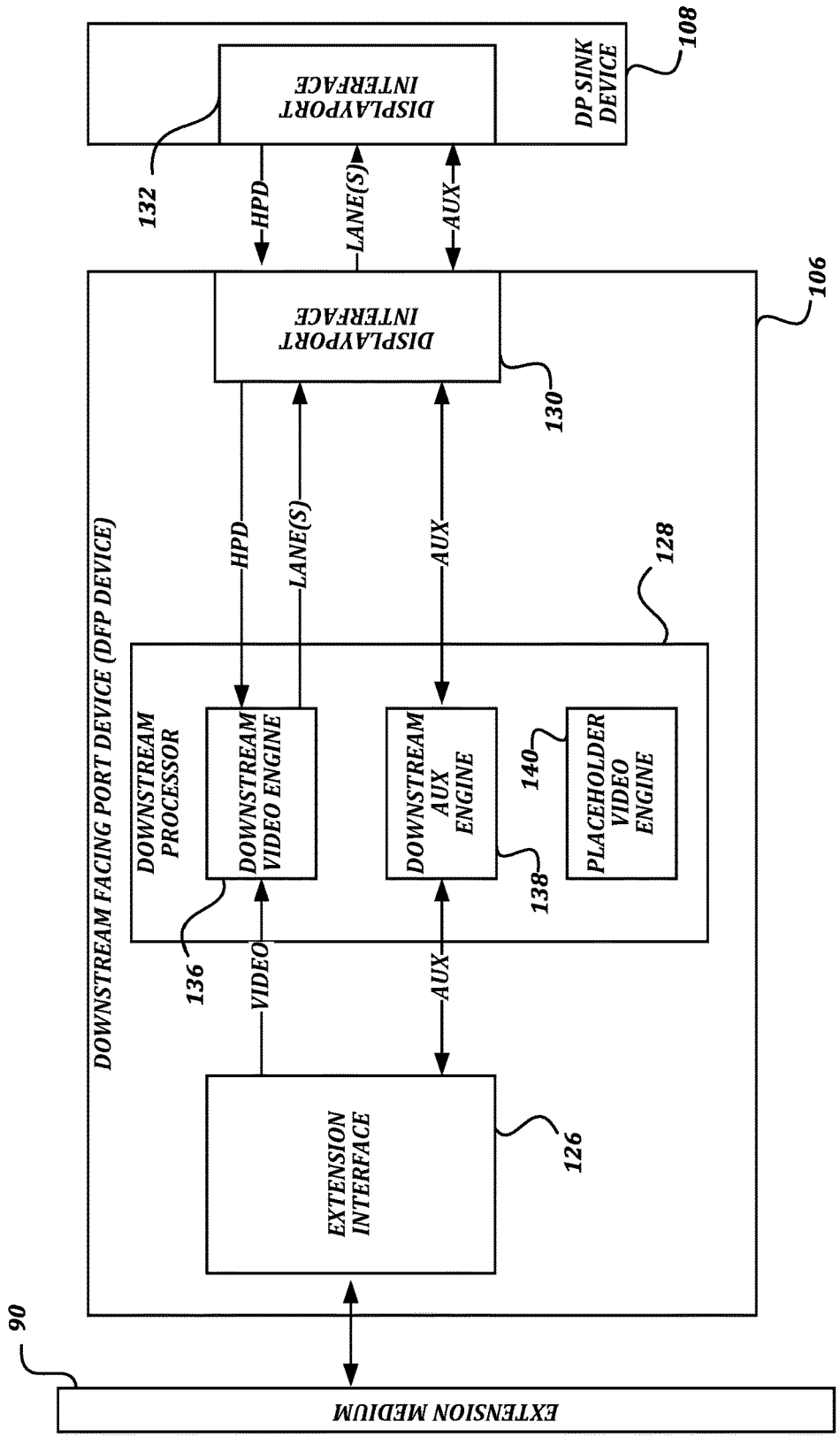

FIGS. 1A and 1B are block diagrams that respectively illustrate non-limiting example embodiments of an upstream facing port device (UFP device) and a downstream facing port device (DFP device) according to various aspects of the present disclosure. In FIG. 1A, a DisplayPort source device 102, an upstream facing port device (UFP device) 104, and an extension medium 90 are illustrated. The DisplayPort source device 102 may be any type of device having a DisplayPort receptacle and capable of transmitting DisplayPort information, including but not limited to a desktop computing device, a laptop computing device, a tablet computing device, a rack-mount computing device, an external graphics card, a video processing system, and/or the like. The DisplayPort source device 102 includes a DisplayPort interface 110, which is communicatively coupled to a DisplayPort interface 112 of the UFP device 104. The connection between the DisplayPort source device 102 and the UFP device 104 via the DisplayPort interfaces 110, 112 includes standard DisplayPort receptacles, a DisplayPort cable, and the like, as described in the DisplayPort specifications and as known to one of ordinary skill in the art. In some embodiments, the DisplayPort interfaces 110, 112 may include one or more of a DisplayPort connector, a USB Type-C connector, and/or a DockPort connector.

As illustrated, the UFP device 104 includes an upstream processor 114. In some embodiments, the upstream processor 114 may be implemented using a field-programmable gate array (FPGA), an application-specific integrated circuit (ASIC), a microcontroller, and/or any other suitable type of computing device or integrated circuit. The upstream processor 114 may be configured to provide an upstream video engine 120, an upstream AUX engine 122, and a DisplayPort sink emulation engine 124.

In general, the word "engine," as used herein, refers to logic embodied in hardware, or software instructions which can be written in a programming language, such as C, C++, COBOL, JAVA™, PHP, Perl, HTML, CSS, JavaScript, VBScript, ASPX, Microsoft .NET™, and/or the like. An engine embodied in hardware may be designed using a hardware description language (HDL). A software engine may be compiled into executable programs or written in interpreted programming languages. Engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or application. The engines may also be implemented using a floating point gate array (FPGA), an application-specific integrated circuit (ASIC), a microcontroller, or any other suitable type of integrated circuit computing device.

In some embodiments, the upstream video engine 120 is configured to receive one or more DisplayPort lanes from the DisplayPort interface 112. The upstream video engine 120 is configured to recover the video and/or audio signals from the DisplayPort lanes, and to provide the video and/or audio signals to the extension interface 116. In some embodiments, the upstream video engine 120 may configurably perform further processing on the video and/or audio before providing it to the extension interface 116, including but not limited to changing a bit rate of the information, encrypting the information, upsampling or downsampling the information, and/or any other type of processing. In some embodiments, the upstream video engine 120 is also configured to selectively provide a hot plug detect (HPD) signal to the DisplayPort source device 102 via the DisplayPort interface 112. The upstream video engine 120 may selectively provide the HPD signal based on instructions received from the upstream AUX engine 122, the DisplayPort sink emulation engine 124, or other components of the UFP device 104. Further illustration and description of an exemplary embodiment of an upstream video engine 120 is provided in FIG. 3 and the accompanying text.

In some embodiments, the upstream AUX engine 122 is configured to manage AUX channel communication with the DisplayPort source device 102 and to control the selective presentation of the HPD signal by the upstream video engine 120. One of the technical challenges of extending DisplayPort communication across the extension medium 90 is that the UFP device 104 may be unaware of the presence, configuration, or capabilities of the DFP device 106 or the DisplayPort sink device 108 upon connection of the DisplayPort source device 102 to the DisplayPort interface 112. Accordingly, the upstream AUX engine 122 manipulates the information communicated via the AUX channel and the HPD signal in order to overcome these challenges.

The upstream AUX engine 122 and the upstream video engine 120 may also be configured to conduct link training with the DisplayPort source device 102. Another technical challenge that arises in implementing a switchable connection over an extension medium 90 is that once link training is conducted with the DisplayPort source device 102, the DisplayPort link between the DisplayPort source device 102 and the UFP device 104 should be kept alive whether or not the UFP device 104 is paired to a DFP device 106. Accordingly, in some embodiments the DisplayPort sink emulation engine 124 is configured provide information to the upstream video engine 120 in place of information that would normally be generated by the DisplayPort sink device 108 in response to signals provided by the DisplayPort source device 102 to keep the link alive. In this way, the UFP device 104 can train and maintain a DisplayPort link with the DisplayPort source device 102, and the DisplayPort source device 102 will therefore not detect any changes even when the pairing between the UFP device 104 and DFP device 106 changes. Further details regarding some example techniques used by the upstream AUX engine 122, the upstream video engine 120, and the DisplayPort sink emulation engine 124 to provide this functionality are provided below.

In some embodiments, the upstream video engine 120 and the upstream AUX engine 122 communicate video/audio and AUX information with the DFP device 106 over the extension medium 90 via an extension interface 116. In some embodiments, the extension medium 90 and communication thereon may include any suitable networking technology, such as Ethernet, Bluetooth, WiFi, WiMax, the Internet, serial communication, and/or the like, and any suitable communication medium, such as via physical cables, via wireless spectrum, via fiber-optic cable, and/or the like. In some embodiments, the UFP device 104 and the DFP device 106 may happen to be closer to each other than the maximum distances specified in the DisplayPort specifications, but may nevertheless communicate via the extension medium 90. In some embodiments, the extension interface 116 is configured to provide a physical layer connection and logic that allows communication over the extension medium 90. Further illustration and description of an exemplary embodiment of an extension interface 116 is provided in FIG. 5 and the accompanying text.

In FIG. 1B, a DisplayPort sink device 108, a downstream facing port device (DFP device), 106, and the extension medium 90 are illustrated. The DisplayPort sink device 108 may be any type of device capable of acting as a DisplayPort sink as described in the DisplayPort specification. Some non-limiting examples of DisplayPort sink devices 108 include liquid crystal display (LCD) monitors, projectors, large-format screens, video processing systems, and/or the like. The DisplayPort sink device 108 includes a DisplayPort interface 132, which is communicatively coupled to a DisplayPort interface 130 of the DFP device 106 using a cable or other connector. As with the connection between the DisplayPort source device 102 and the UFP device 104, the cable and interfaces 130, 132 include standard DisplayPort receptacles, plugs, conductors, and the like, as described in the DisplayPort specifications and as known to one of ordinary skill in the art.

In some embodiments, the DFP device 106 includes a downstream processor 128. As with the upstream processor 114, the downstream processor 128 and/or its components may be implemented using an FPGA, an ASIC, a microcontroller, and/or any other suitable type of computing device or integrated circuit. In some embodiments, the downstream processor 128 provides a downstream video engine 136, a downstream AUX engine 138, and a placeholder video engine 140.

In some embodiments, the downstream video engine 136 is configured to receive video and/or audio signals from either the extension interface 126 or the placeholder video engine 140, and to generate one or more DisplayPort lanes based on the video and/or audio signals. The downstream video engine 136 is configured to provide the DisplayPort lanes to the DisplayPort sink device 108 via the DisplayPort interface 130. The downstream video engine 136 may also be configured to receive and detect the HPD signal transmitted by the DisplayPort sink device 108 via the DisplayPort interface 130. Further illustration and description of an exemplary embodiment of a downstream video engine 136 is provided in FIG. 4 and the accompanying text.

In some embodiments, the downstream AUX engine 138 is configured to manage AUX channel communication with the DisplayPort sink device 108. This may include determining the capabilities of the DisplayPort sink device 108, such that a maximum possible bandwidth or other quality of connection is determined. The downstream AUX engine 138 and the downstream video engine 136 may also be configured to conduct link training with the DisplayPort sink device 108. In some embodiments, link training may be conducted by the downstream AUX engine 138 and downstream video engine 136 in order to establish a highest-possible bandwidth link between the DFP device 106 and the DisplayPort sink device 108 based on the capabilities reported by the DisplayPort sink device 108. In some embodiments, link training may be conducted in order to match a standard link configuration that is kept constant across the system. In some embodiments, once the link between the DFP device 106 and the DisplayPort sink device 108 is trained at a given timing (but before the DFP device 106 is paired to a UFP device 104 and starts receiving actual video data from it), the placeholder video engine 140 is configured to generate placeholder video data at the given timing, and to provide the generated placeholder video data to the downstream video engine 136 to be incorporated into DisplayPort data transmitted via the DisplayPort interface 130 to the DisplayPort sink device 108 in order to keep the link alive. Once actual video data is received by the DFP device 106, the downstream video engine 136 may use the actual video data instead of the placeholder video data to create the DisplayPort data. Further details regarding some example techniques used by the downstream AUX engine 138, the downstream video engine 136, and the placeholder video engine 140 to provide this functionality are provided below.

In some embodiments, the downstream video engine 136 and the downstream AUX engine 138 communicate with the upstream video engine 120 and the upstream AUX engine 122 via the extension medium 90 using the extension interface 126. The extension medium was described above, and the extension interface 126 is also similar to the extension interface 116 illustrated in FIG. 1A (though operating in reverse). Further illustration and description of an exemplary embodiment of an extension interface 126 is provided in FIG. 5 and the accompanying text.

Figure 2:
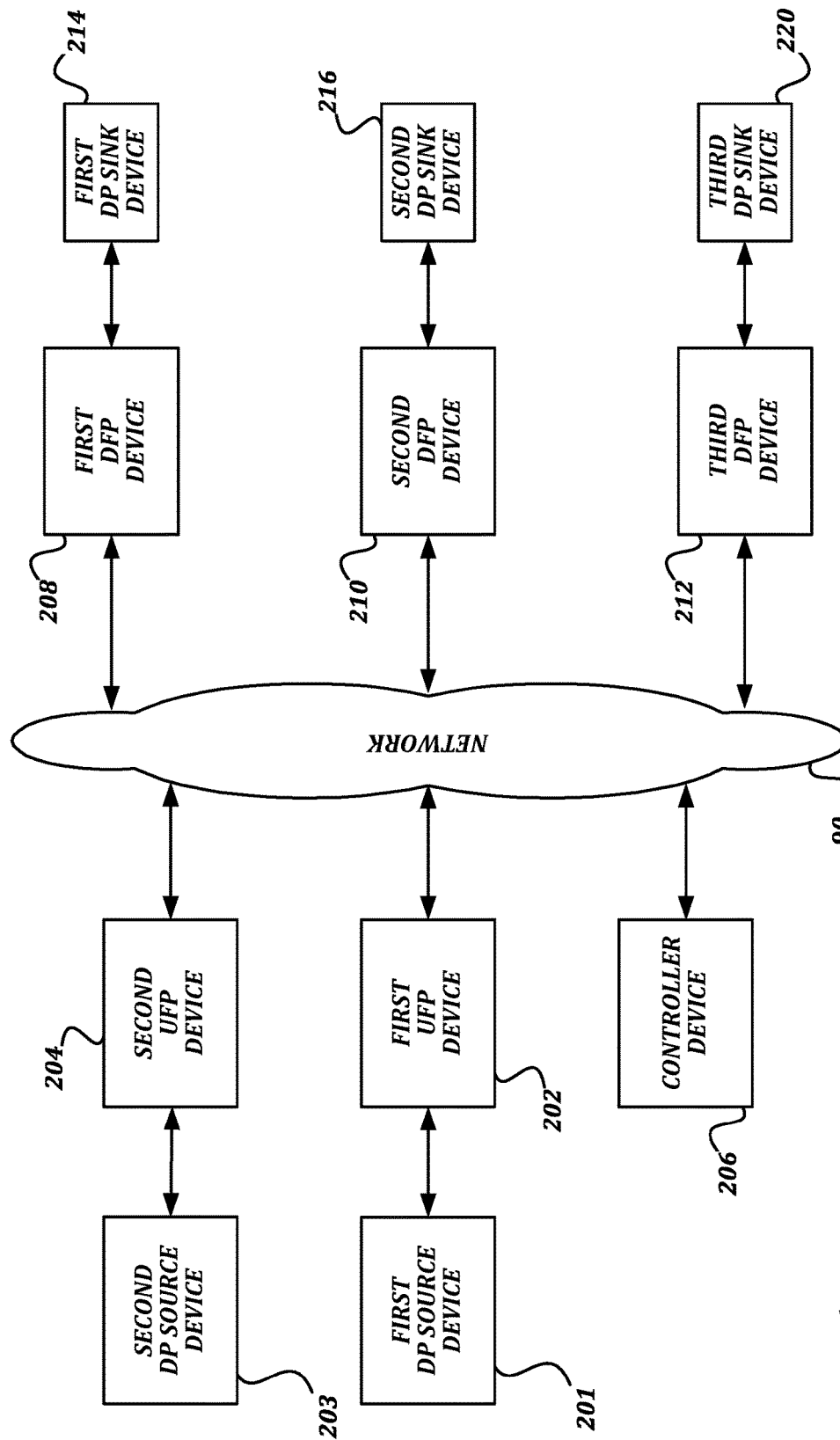
FIG. 2 is a schematic diagram that illustrates a non-limiting example of a communication topology that shows various aspects of the present disclosure.

FIG. 2 is a schematic diagram that illustrates a non-limiting example of a communication topology that shows various aspects of the present disclosure. In FIG. 2, a network 90 is shown as connecting a first UFP device 202, a second UFP device 204, a controller device 206, a first DFP device 208, a second DFP device 210, and a third DFP device 212. In some embodiments, more or fewer UFP devices and/or DFP devices may be present.

Each of the UFP devices is connected to a DisplayPort source device: the first UFP device 202 is connected to a first DisplayPort source device 201, and the second UFP device 204 is connected to a second DisplayPort source device 203. Likewise, each of the DFP devices is connected to a DisplayPort sink device: the first DFP device 208 is connected to a first DisplayPort sink device 214, the second DFP device 210 is connected to a second DisplayPort sink device 216, and the third DFP device 212 is connected to a third DisplayPort sink device 220. The UFP devices 202, 204 are each examples of a UFP device 104 described above, and the DFP devices 208, 210, 212 are each examples of a DFP device 106 described above. Similarly, the DisplayPort source devices 201, 203 are each examples of the DisplayPort source device 102 described above, and the DisplayPort sink devices 214, 216, 220 are each examples of the DisplayPort sink device 108 described above.

In some embodiments, a controller device 206 may be used to receive configuration information from, and send configuration commands to, the UFP devices 202, 204 and the DPF devices 208, 210, 212 via the network 90. In some embodiments, the controller device 206 may broadcast requests for configuration information to the network 90, using a technique such as IP broadcast, IP multicast, and/or any other suitable technique. The UFP devices 202, 204 and DFP devices 208, 210, 212 connected to the network 90 may then transmit responses to the controller device 206, which receives and compiles the responses to form a representation of the communication topology 200. The responses transmitted to the controller device 206 may include information such as, but not limited to, a unique hardware identifier (such as a MAC address or the like), a network address (such as an IP address or the like), a supported protocol version, a vendor name, a product name, a revision, and/or identifiers of one or more other extension devices with which the extension device is paired. The controller device 206 may use the configuration information to generate a graphical representation of the communication topology 200, and may subsequently present the graphical representation of the communication topology 200 to a user. The controller device 206 may also accept commands from a user with respect to the presented communication topology 200 in order to reconfigure the communication topology 200, as discussed below.

The controller device 206 may be any computing device suitable for providing commands to the UFP devices 202, 204 and the DFP devices 208, 210, 212 via the network 90. For example, the controller device 206 may be a laptop computer, desktop computer, tablet computer, smartphone, or other computing device connected to the network 90, and may request information from and send commands to the UFP devices 202, 204 and DFP devices 208, 210, 212 via the network 90. As another example, the controller device 206 may be integrated partially or fully within one of the DisplayPort source devices 201, 203, one of the UFP devices 202, 204, one of the DFP devices 208, 210, 212, or one of the DisplayPort sink devices 214, 216, 220, and may accept configuration commands from the user via a user interface device including, but not limited to, a mechanical button or switch, a jumper setting, a dip switch, and a device configured to present a graphical user interface. Though a single controller device 206 is illustrated in FIG. 2, in some embodiments, more than one controller device 206 may be used.

In some embodiments, the controller device 206 is configured to send configuration commands to the UFP devices 202, 204 and the DFP devices 208, 210, 212 that include instructions regarding how the UFP devices 202, 204 and the DFP devices 208, 210, 212 should be configured to communicate on the network. For example, in some embodiments, the controller device 206 may send a command to a UFP device 202 instructing the UFP device 202 to automatically obtain an IPv4 address from an address server device (such as a DHCP server and/or the like) on the network 90. As another example, in some embodiments, the controller device 206 may send a command to a UFP device 202 instructing the UFP device 202 to use a static IPv4 address supplied in the command. As yet another example, in some embodiments, the controller device 206 may send a command to a UFP device 202 instructing the UFP device 202 to obtain an IPv6 address using stateless address autoconfiguration (SLAAC), or using any other suitable technique. One of ordinary skill in the art will understand that such commands could also be sent to the other UFP device 204 and/or any of the DFP devices 208, 210, 212, and that any other suitable technique for obtaining an address on any type of network may also be used.

In some embodiments, each UFP device 202, 204 may be paired with zero or one DFP devices 208, 210, 212, and each DFP device 208, 210, 212 may be paired with zero or one UFP devices 202, 204 at any given time. While the first UFP device 202 is paired with the first DFP device 208, the first UFP device 202 is able to transmit video and/or audio data from the first DisplayPort source device 201 to the first DFP device 208, and the first DFP device 208 is then able to transmit DisplayPort data containing the video and/or audio data from the first DisplayPort source device 201 to the first DisplayPort sink device 214. The pairings may then be changed to switch the video and/or audio to be presented on the first DisplayPort sink device 214. For example, the pairing may be changed to pair the second UFP device 204 (instead of the first UFP device 202) with the first DFP device 208. After the pairing is changed, the second UFP device 204 is able to transmit video and/or audio data from the second DisplayPort source device 203 to the first DFP device 208, and then the first DFP device 208 is able to transmit DisplayPort data containing the video and/or audio data from the second DisplayPort source device 203 (instead of the first DisplayPort source device 201) to the first DisplayPort sink device 214. Because the UFP devices 202, 204 form link partner relationships with their associated DisplayPort source devices 201, 203 and maintain those links regardless of the pairing configuration, and because the DFP devices 208, 210, 212 also form link partner relationships with their associated DisplayPort sink devices 214, 216, 220 and maintain those links regardless of the pairing configuration, the switching of pairings may be transparent to both the DisplayPort source devices 201, 203 and the DisplayPort sink devices 214, 216, 220, as described further below.

FIG. 2 illustrates a generic communication topology 200, but one of ordinary skill in the art will recognize that the communication topology 200 has many useful applications. In one non-limiting example embodiment, a communication topology similar to the communication topology 200 may be used to provide switchable access to a single projector (a DisplayPort sink device) in a conference room to multiple laptop or desktop computers (DisplayPort source devices) in the conference room. The ability to reconfigure the topology to seamlessly switch the projector from a first laptop to a second laptop would be vastly superior to existing systems that would require a lengthy process of re-configuring the link to the projector each time a new laptop is connected. In another non-limiting example embodiment, a plurality of computing devices may be arranged in a cluster, a server farm, a test bench, or some other situation that makes having individual display devices connected to each computing device impractical or impossible. By using a communication topology similar to the communication topology 200, one DisplayPort sink device could be shared by all of the computing devices, and the display could quickly and seamlessly be switched from one computing device to another without having to wait for the DisplayPort link to retrain each time. As will be recognized by one of ordinary skill in the art, the above example topology embodiments are examples only and should not be seen as limiting. In some embodiments, other configurations of embodiments of the present disclosure may be used.

FIG. 3 is a block diagram that illustrates a non-limiting example embodiment of an upstream video engine according to various aspects of the present disclosure. As illustrated, the upstream video engine 120 includes a SERDES engine 302, a decoding engine 304, and a descrambling engine 306. The SERDES engine 302, or serializer/deserializer engine, is configured to deserialize parallel data streams that have been received via the DisplayPort interface 112 in a serial format. The received data streams may include one or more scrambled and encoded video data streams. The received signals may also include AUX channel data, audio data, and/or other types of data.

The decoding engine 304 is configured to decode the encoded signals received from the SERDES engine 302. The decoding algorithm to be used may be specified via AUX channel communication, such that the decoding engine 304 can be configured to use a decoding technique that matches the incoming data. Some non-limiting examples of encoding formats include 8b/10b encoding, Display Stream Compression (DSC) encoding, and the like. The descrambling engine 306 is configured to descramble the decoded video signals generated by the decoding engine 304. Techniques for descrambling are described in the DisplayPort specifications. The output of the descrambling engine 306 (and therefore the upstream video engine 120) is a video signal suitable for presentation by a video presentation device or suitable for further video processing. An H.264 stream is one non-limiting example of the output, though other suitable video formats may be used. In some embodiments, the output of the upstream video engine 120 may include audio information and/or AUX channel information as well.

In some embodiments, the illustrated components of the upstream video engine 120 may be combined with each other, or individual components may be split into multiple components. Some other example components suitable for use in the upstream video engine 120 are described in the descriptions in the DisplayPort specifications of components for providing a main link.

FIG. 4 is a block diagram that illustrates a non-limiting example embodiment of a downstream video engine according to various aspects of the present disclosure. In some embodiments, the downstream video engine 136 provides the inverse of the functionality of the upstream video engine 136. That is, the downstream video engine 136 may receive video and audio signals suitable for presentation, and may transmit DisplayPort data. As illustrated, the downstream video engine 136 includes a scrambling engine 402, an encoding engine 404, and a SERDES engine 406. The scrambling engine 402 receives the video and/or audio signals and scrambles them using any suitable technique, including but not limited to the techniques described in the DisplayPort specification. The encoding engine 404 receives the scrambled video and/or audio signals from the scrambling engine 402 and encodes them using any suitable technique, including but not limited to 8b/10b encoding, DSC encoding, and/or the like. The SERDES engine 406 then joins multiple scrambled and encoded data streams into a single serialized signal for transmission. As with the components of the upstream video engine 120, the components of the downstream video engine 136 may be combined or split apart, and both the functionality and the structure are similar to the main link described in the DisplayPort specifications.

Figure 5:
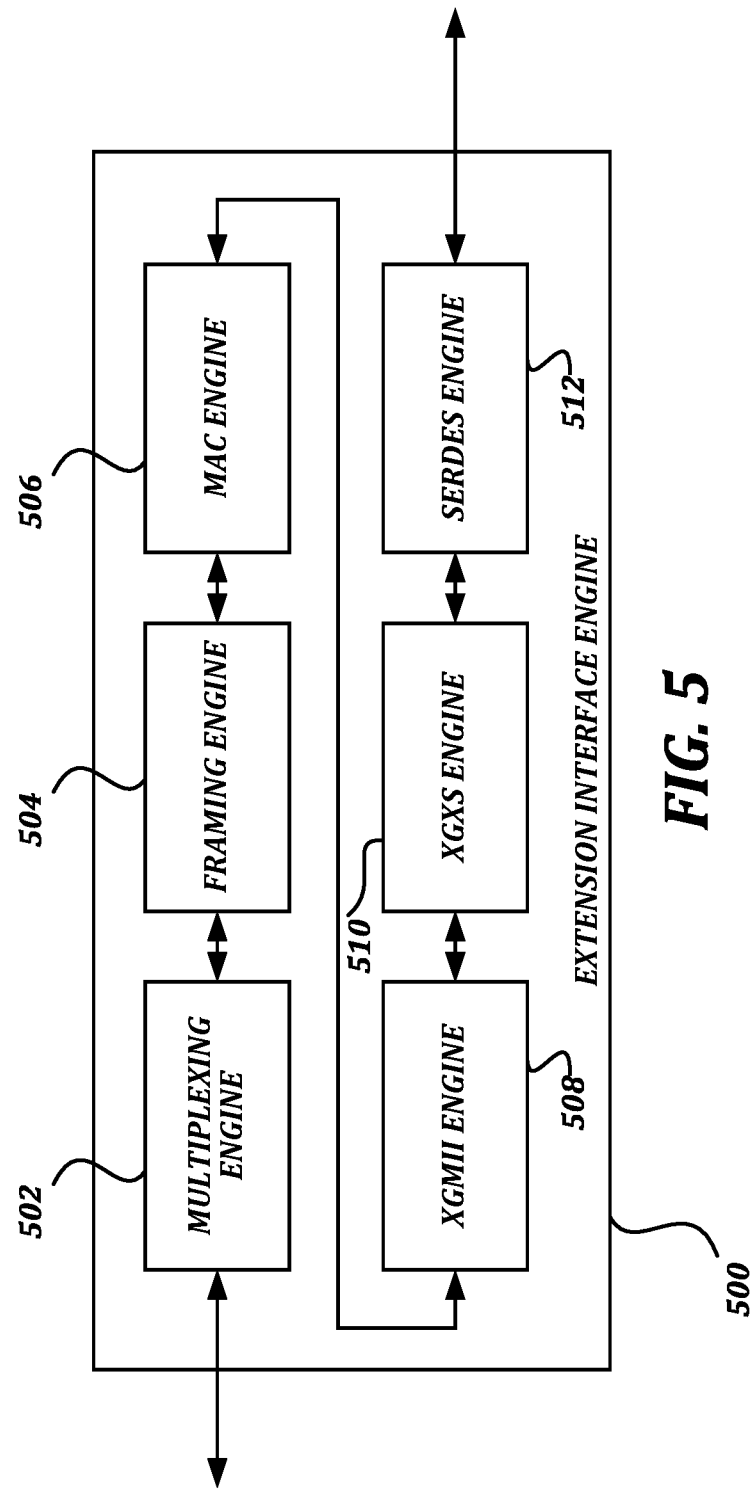
FIG. 5 is a block diagram that illustrates a non-limiting example embodiment of an extension interface engine according to various aspects of the present disclosure.
Figure 6A:
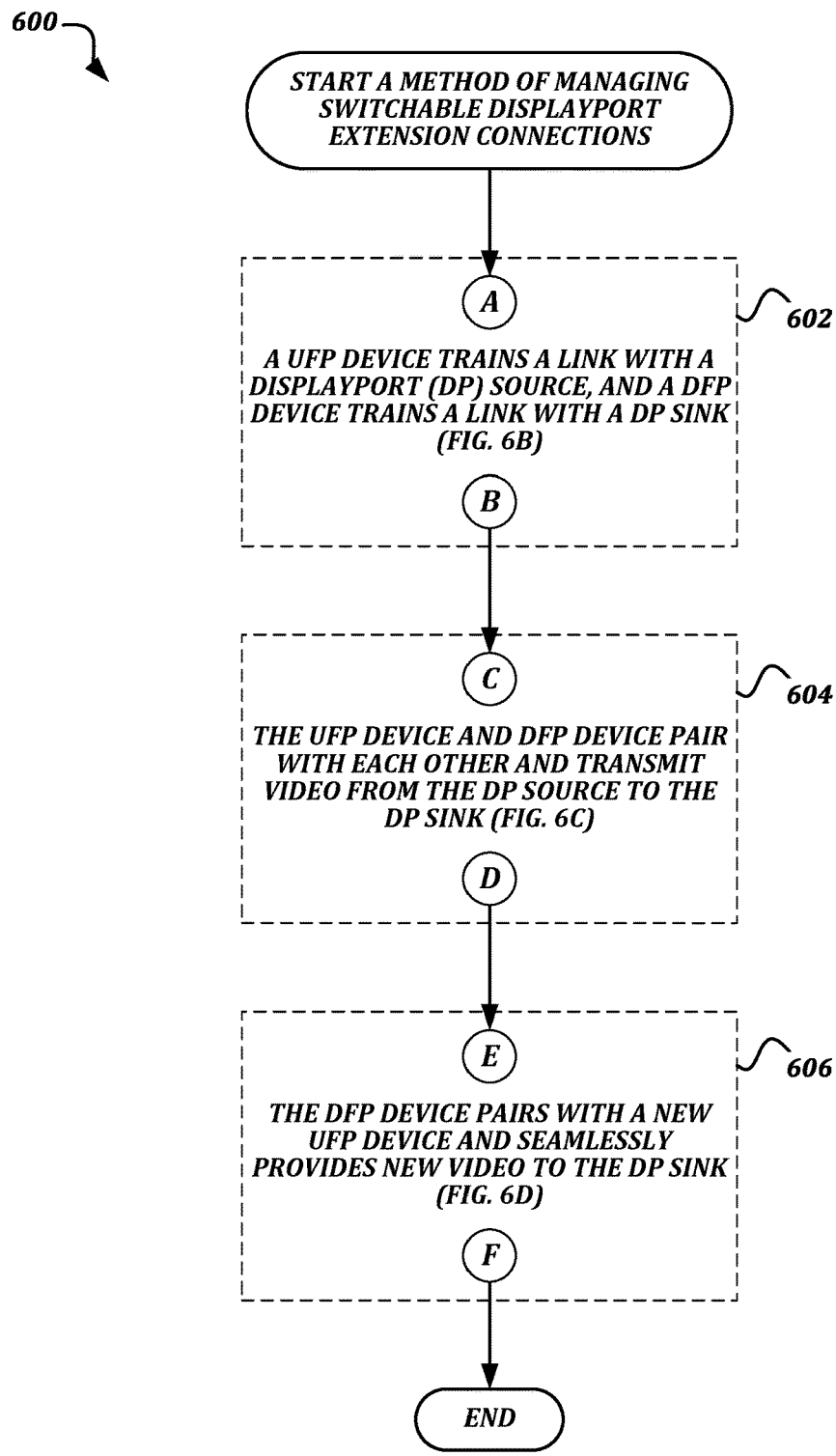
FIGS. 6A-6D are a flowchart that illustrates a non-limiting example embodiment of a method of managing switchable DisplayPort extension connections according to various aspects of the present disclosure.
Figure 6B:
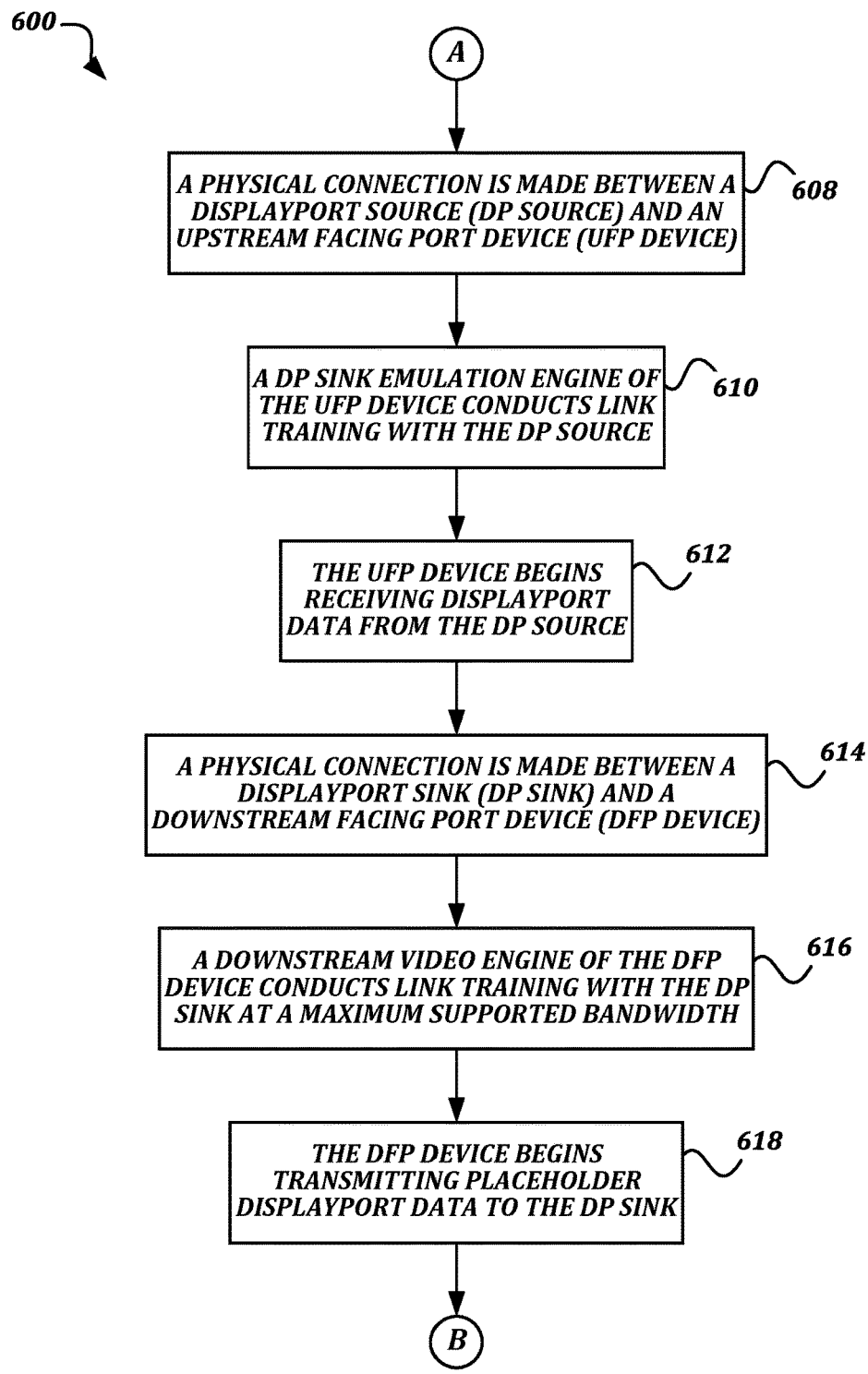
Figure 6C:
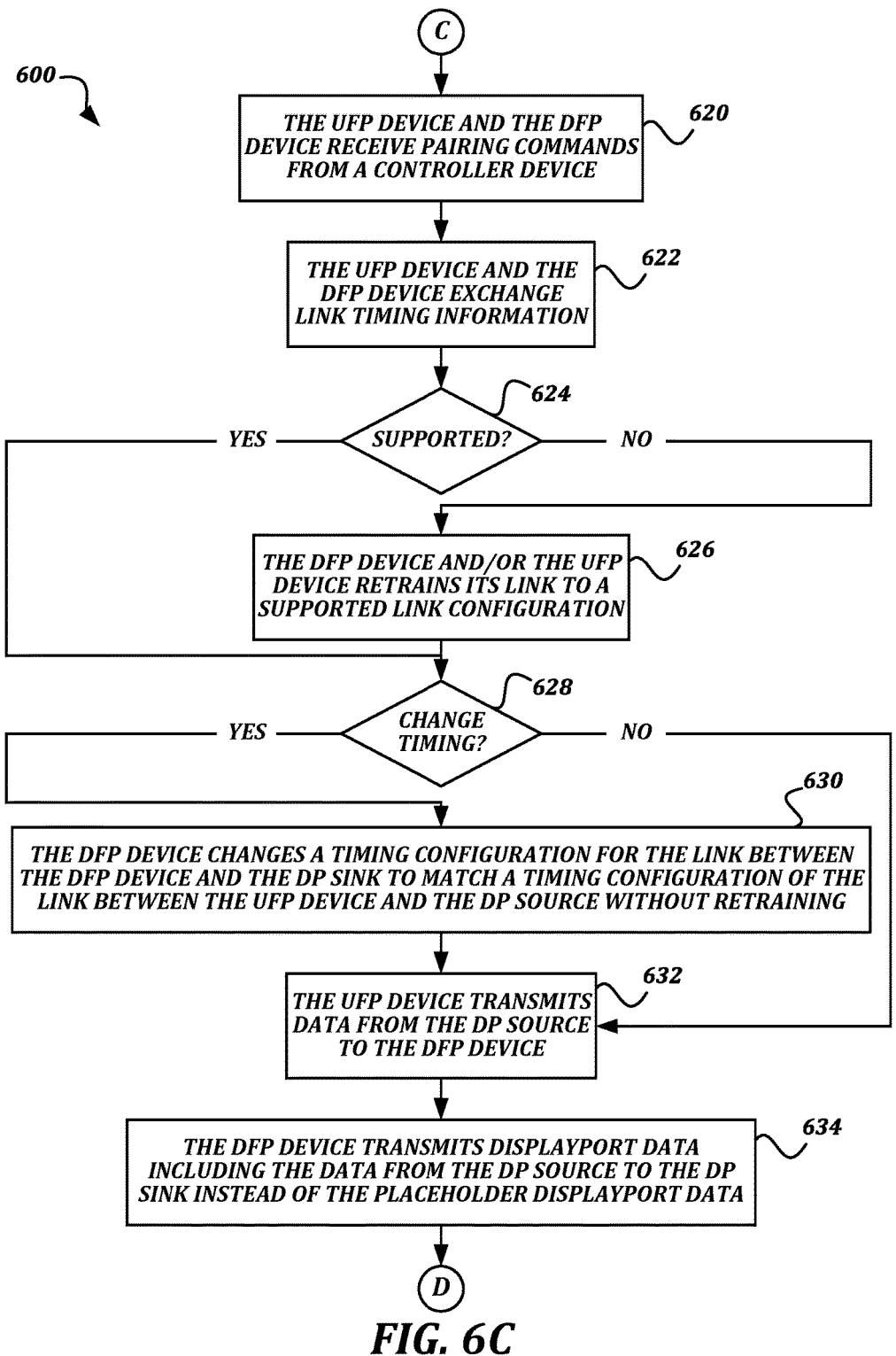
Figure 6D:
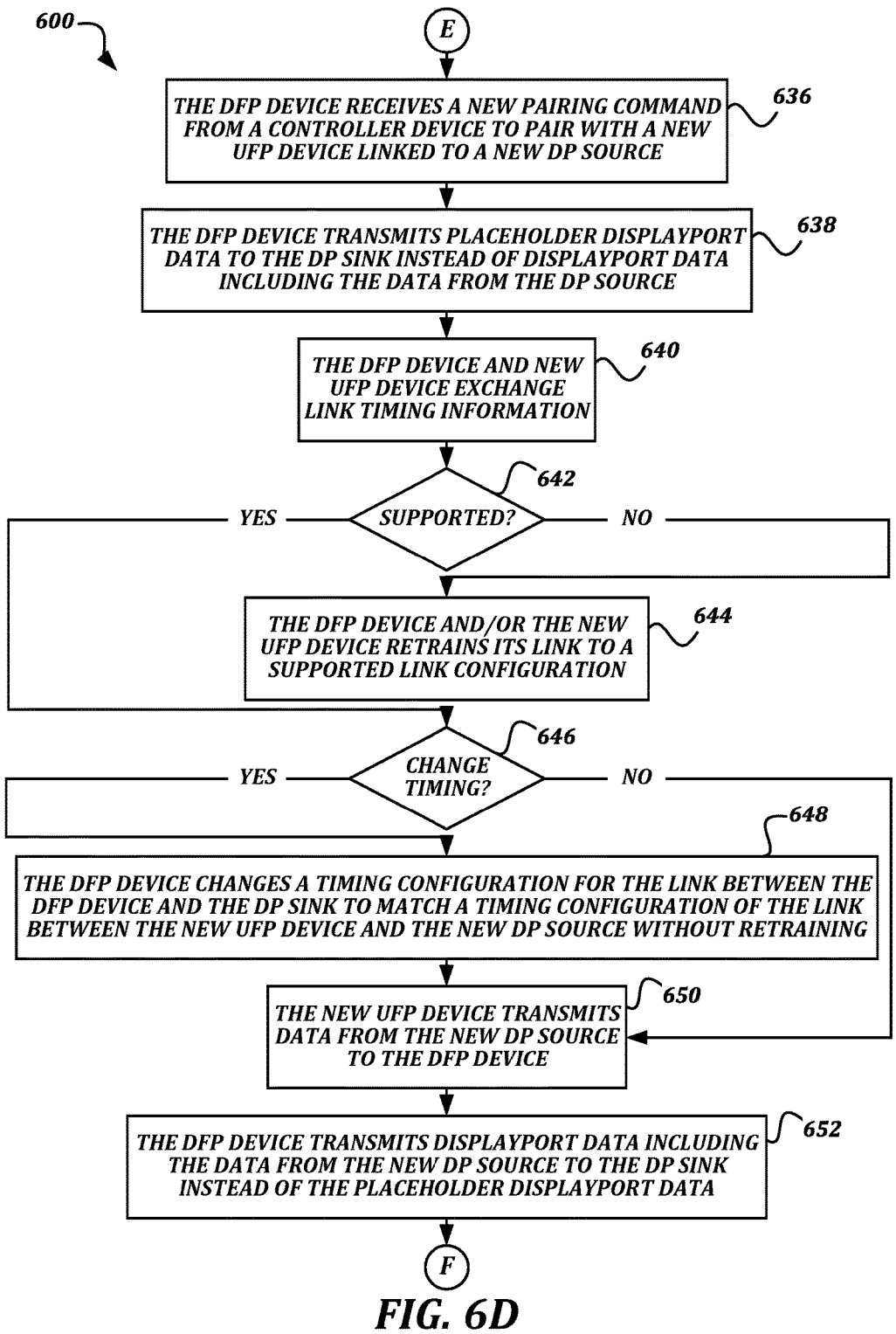

FIG. 5 is a block diagram that illustrates a non-limiting example embodiment of an extension interface engine according to various aspects of the present disclosure. A primary purpose of the extension interface engine 500, when on the UFP device 104, is to transmit the video, audio, and/or AUX signals over the extension medium 90 in an extension format. When on the DFP device 106, a primary purpose of the extension interface engine 500 is to receive extension format information from the extension medium 90 and convert it back into the original video, audio, and/or AUX signals. The extension interface engine 500 may also communicate information bi-directionally, and may be used for conducting a connection handshake between the UFP device 104 and the DFP device 106.

As illustrated, the extension interface engine 500 includes a multiplexing engine 502, a framing engine 504, a media access control (MAC) engine 506, a 10-gigabit media-independent interface (XGMII) engine 508, an XGMII extender sublayer (XGXS) engine 510, and a SERDES engine 512. Obtaining, implementing, and/or integrating each of these components with each other to form the extension interface engine 500 is within the knowledge of one of ordinary skill in the art, and so is not described in detail. The extension interface engine 500 as illustrated is configured to use gigabit Ethernet as the extension medium 90. In some embodiments, a different extension medium 90 may be used, and so the components of the extension interface engine 500 would be selected as appropriate for use with the different extension medium.

FIGS. 6A-6D are a flowchart that illustrates a non-limiting example embodiment of a method of managing switchable DisplayPort extension connections according to various aspects of the present disclosure. From a start block, the method 600 proceeds to a set of method steps 602 defined between an entry terminal ("terminal A") and an exit terminal ("terminal B"). In the set of method steps 602, a UFP device 104 trains a link with a DisplayPort source device 102, and a DFP device 106 trains a link with a DisplayPort sink device 108. While the below description refers to the detailed illustrations of the DisplayPort source device 102, UFP device 104, DFP device 106, and DisplayPort sink device 108, one of ordinary skill in the art will recognize that the descriptions may also interchangeably refer to the first DisplayPort source device 201, first UFP device 202, first DFP device 208, and first DisplayPort sink device 214.

From terminal A (FIG. 6B), the method 600 proceeds to block 608, where a physical connection is made between a DisplayPort source device 102 and an upstream facing port device (UFP device) 104. The physical connection between the DisplayPort source device 102 and the UFP device 104 may be formed between the DisplayPort interface 110 and the DisplayPort interface 112 as described above.

At block 610, a DisplayPort sink emulation engine 124 of the UFP device 104 conducts link training with the DisplayPort source device 102. The upstream video engine 120 and the upstream AUX engine 122 may also take part in the link training process. In some embodiments, the DisplayPort sink emulation engine 124 may generate EDID messages, DPCD messages, and/or DisplayID messages to be transmitted by the upstream AUX engine 122 to emulate the presence of a DisplayPort sink. Otherwise, link training between the DisplayPort source device 102 and the UFP device 104 may occur substantially as described in the DisplayPort specification. In some embodiments, the DisplayPort sink emulation engine 124 may cause the link to be trained at a maximum bandwidth, bit depth, refresh rate, resolution, or timing supported by the DisplayPort source device 102. In some embodiments, the DisplayPort sink emulation engine 124 may cause the link to be trained at a maximum bandwidth, bit depth, refresh rate, resolution, or timing that can be supported by the extension medium 90. In some embodiments, the DisplayPort sink emulation engine 124 may cause the link to be trained at a standard bandwidth, bit depth, refresh rate, resolution, or timing that is consistent across the communication topology 200 or instructed by the controller device 206.

At block 612, the UFP device 104 begins receiving DisplayPort data from the DisplayPort source device 102. The DisplayPort data includes video data generated by the DisplayPort source device 102 at the timing negotiated during link training between the UFP device 104 and the DisplayPort source device 102. In some embodiments, the DisplayPort data may also include audio and/or other data streams transmitted via the DisplayPort connection. Before pairing between the UFP device 104 and the DFP device 106 occurs, the DisplayPort sink emulation engine 124 receives the DisplayPort data but may simply provide the required acknowledgements to keep the link active without performing further processing or transmission of the received DisplayPort data.

At block 614, a physical connection is made between a DisplayPort sink device 108 and a downstream facing port device (DFP device) 106. The physical connection between the DisplayPort sink device 108 and the DFP device 106 may be formed between the DisplayPort interface 130 and the DisplayPort interface 132 as described above.

At block 616, a downstream video engine 136 of the DFP device 106 conducts link training with the DisplayPort sink device 108 at a maximum supported bandwidth. In some embodiments, the downstream AUX engine 138 may also take part in the link training process. In some embodiments, the downstream AUX engine 138 may request EDID, DPCD, and/or DisplayID information from the DisplayPort sink device 108, and may train the link between the DFP device 106 and the DisplayPort sink device 108 at the maximum bandwidth, highest resolution, highest bit depth, highest refresh rate, and/or fastest timing supported by the DisplayPort sink device 108 and/or the physical connection. In some embodiments, the downstream AUX engine 138 may train the link between the DFP device 106 and the DisplayPort sink device 108 to match a standard bandwidth, bit depth, refresh rate, resolution, and/or timing established for the communication topology 200 or as instructed by the controller device 206. In some embodiments, training the link between the DFP device 106 and the DisplayPort sink device 108 to a maximum bandwidth, highest bit depth, highest refresh rate, highest resolution, and/or fastest timing increases the chances that the DFP device 106 will be able to manipulate the incoming video data to match the timing of the link without re-training the link, in the event that the incoming video data does not exactly match the existing timing of the link.

The method 600 then proceeds to block 618, where the DFP device 106 begins transmitting placeholder DisplayPort data to the DisplayPort sink device 108. The placeholder DisplayPort data is generated by the downstream video engine 136, and includes placeholder video data generated by the placeholder video engine 140. The placeholder video data is generated by the placeholder video engine 140 at a timing that matches the timing that was negotiated during link training. In some embodiments, the placeholder video data may include a static image or a blank image. In some embodiments, the placeholder video data may be a moving video such as a screen saver to prevent burn-in of any static image on the display.

It should be noted that the connection and link training between the UFP device 104 and the DisplayPort source device 102 described in blocks 608-612 is independent from the connection and link training between the DFP device 106 and the DisplayPort sink device 108 described in blocks 614-618. As such, blocks 608-612 could happen at least partially at the same time as blocks 614-618, or blocks 614-618 could occur blocks 608-612.

The method 600 then proceeds to terminal B. From terminal B (FIG. 6A), the method 600 proceeds to a set of method steps 604 defined between an entry terminal ("terminal C") and an exit terminal ("terminal D"). In the set of method steps 604, the UFP device 104 and the DFP device 106 pair with each other and transmit video from the DisplayPort source device 102 to the DisplayPort sink device 108. Again, while the below description refers to the detailed illustrations of the DisplayPort source device 102, UFP device 104, DFP device 106, and DisplayPort sink device 108, one of ordinary skill in the art will recognize that the descriptions may also interchangeably refer to the first DisplayPort source device 201, first UFP device 202, first DFP device 208, and first DisplayPort sink device 214.

From terminal C (FIG. 6C), the method 600 proceeds to block 620, where the UFP device 104 and the DFP device 106 receive pairing commands from a controller device 206. In some embodiments, the pairing commands may include the unique network addresses of the UFP device 104 and/or the DFP device 106. In some embodiments, the command may be generated by a user interacting with a graphical representation of the communication topology 200 presented by a controller device 206. In other embodiments, the command may be generated in simpler ways. For example, the command may be generated by a keystroke combination entered using an input device of the controller device 206. As another example, in some embodiments a button may be pressed on the DFP device 106 to cause the DFP device 106 to broadcast its unique network address, while a button is pressed on the UFP device 104 to cause the UFP device 104 to interpret the network address broadcast by the DFP device 106 as a command to pair with the DFP device 106. In some embodiments, a unique network address of the DFP device 106 may be manually entered into the UFP device 104, using an interface integrated into the UFP device 104, a set of dip switches or jumpers integrated into the UFP device 104, or using any other suitable technique.

One of ordinary skill in the art will recognize that, although "unique network addresses" are used in the discussion herein for addressing messages to particular extension devices, other techniques could be used to uniquely identify each of the extension devices in the communication topology 200. For example, MAC addresses or other suitable unique hardware identifiers could be used to uniquely address the extension devices.

Once the UFP device 104 and the DFP device 106 are paired, the method 600 proceeds to block 622, where the UFP device 104 and the DFP device 106 exchange link timing information. The link timing information represents the timing of the link between the UFP device 104 and the DisplayPort source device 102, and the timing of the link between the DFP device 106 and the DisplayPort sink device 108. The link timing information may include one or more of a resolution, a bit depth, a refresh rate, a number of lanes, a link rate, and/or any other type of timing information. The exchange occurs so that the UFP device 104 and the DFP device 106 can determine whether the link timing is close enough to avoid retraining the link between the DFP device 106 and the DisplayPort sink device 108. For example, if each aspect of the timing is the same, then it would clearly be close enough. As another example, if the link between the UFP device 104 and the DisplayPort source device 102 uses a lower bit depth or fewer lanes, the downstream video engine 136 may be able to upsample or otherwise alter the incoming data to create DisplayPort data that matches the timing of the link between the DFP device 106 and the DisplayPort sink device 108. As yet another example, as long as the link clock rate for the link between the DFP device 106 and the DisplayPort sink device 108 is greater than or equal to the link clock rate of the link between the DisplayPort source device 102 and the UFP device 104, then the DFP device 106 can generate and transmit the DisplayPort data based on the timing of the incoming video data without retraining the link. However, if the video provided by the source cannot be transmitted using the timing of the link between the DFP device 106 and the DisplayPort sink device 108 (e.g., if the link between the DisplayPort source device 102 and the UFP device 104 is transmitting over a high-bandwidth link such as 4K resolution at 24 bpp and 60 Hz, and the link between the DFP device 106 and the DisplayPort sink device 108 only has one lane), it may not be close enough to be supported.

At decision block 624, a determination is made regarding whether the link between the DFP device 106 and the DisplayPort sink device 108 can support transmission of video at the timing that will be provided by the UFP device 104. If the video can be supported, then the result of decision block 624 is YES, and the method 600 proceeds to decision block 628. Otherwise, if the video cannot be supported, then the result of decision block 624 is NO, and the method 600 proceeds to block 626, where the DFP device 106 and/or the UFP device 104 retrains its link to either the DisplayPort sink device 108 or DisplayPort source device 102, respectively, to a supported link configuration. For example, if a situation such as the one above where the link between the DisplayPort source device 102 and the UFP device 104 was high bandwidth and the link between the DFP device 106 and the DisplayPort sink device 108 was low bandwidth, the UFP device 104 and DFP device 106 may negotiate to determine whether the link to the DisplayPort sink device 108 could be retrained to a higher bandwidth, or whether the link to the DisplayPort source device 102 should be retrained to a lower bandwidth. This situation is not ideal, because one of the benefits of the remainder of the method 600 is that such retraining can be avoided and the switching can be seamless. However, this functionality may be provided by some embodiments of the present disclosure in order to ensure that all combinations of DisplayPort source devices 102 and DisplayPort sink devices 108 may be supported by a given communication topology 200. The method 600 then proceeds from block 626 to decision block 628.

At decision block 628, a determination is made as to whether the timing of the DisplayPort data being transmitted from the DFP device 106 to the DisplayPort sink device 108 needs to change. At this point in the method 600, it is already known that the timing configuration of the DisplayPort data supports the timing of the video data being received (after decision block 624 or block 626 has advanced to decision block 628). Even if the timing is different in some aspect, at this point the DFP device 106 can compensate for the differences in timing without re-training the link to the DisplayPort sink device 108. If the timing is different (or the received video data cannot be changed by the DFP device 106 to match the link timing), then the result of decision block 628 is YES, and the method 600 proceeds to block 630. At block 630, the DFP device 106 changes a timing configuration for the link between the DFP device 106 and the DisplayPort sink device 108 to match a timing configuration of the link between the UFP device 104 and the DisplayPort source device 102 without retraining the link between the DFP device 106 and the DisplayPort sink device 108. In some embodiments, changing the timing configuration may include sending five DisplayPort idle patterns before sending the new timing information and the new video stream. In some embodiments, changing the timing configuration may include changing the timing of the placeholder video data to the new timing, and transmitting DisplayPort data including the new placeholder video data after the five idle patterns (and before receiving actual video data from the UFP device 104 as described below. The new timing information may be identical to the timing of the video data received from the UFP device 104, or may be changed to a configuration that is not identical but for which the DFP device 106 can alter the received video data to match.

After block 630, or if the timing did not need to change and the result of decision block 628 was NO, then the method 600 proceeds to block 632. At block 632, the UFP device 104 transmits data from the DisplayPort source device 102 to the DFP device 106. The data includes video extracted by the upstream video engine 120 from the DisplayPort data received from the DisplayPort source device 102. In some embodiments, other information may also be extracted and transmitted to the DFP device 106, including but not limited to audio data, USB data, and/or any other data transmitted from the DisplayPort source device 102 to the UFP device 104.

At block 634, the DFP device 106 transmits DisplayPort data including the data from the DisplayPort source device 102 to the DisplayPort sink device 108, instead of transmitting the placeholder DisplayPort data to the DisplayPort sink device 108. In some embodiments, switching from placeholder DisplayPort data to the DisplayPort data including the data from the UFP device 104 may send five idle patterns between the two types of data. In some embodiments, in cases where the timing is the same the five idle patterns may not be sent, and the source of the video to be placed in the DisplayPort data is simply changed. In some embodiments, the DFP device 106 may wait for a frame boundary to make the switch. The result of these actions is a seamless transition from the placeholder video to the actual video data. Because there is no re-training of the link, there should be no visual artifacts of the switch at the DisplayPort sink device 108 (such as a "no signal" notification or other loss of connection shown by the DisplayPort sink device 108), and the switch should happen faster than if link retraining was conducted. The lack of visual artifacts and the speed of the switchover are both benefits over systems that do not use the techniques described herein.

The method 600 then proceeds to terminal D, and from terminal D (FIG. 6A) to a set of method steps 606 defined between an entry terminal ("terminal E") and an exit terminal ("terminal F"). In the set of method steps 606, the DFP device 106 pairs with a new UFP device 104 and seamlessly provides new video generated by a new DisplayPort source device 102 coupled to the new UFP device 104 to the DisplayPort sink device 108. The set of method steps 606 refers to the detailed illustrations of the DisplayPort source device 102, the UFP device 104, the DFP device 106, and the DisplayPort sink device 108. One of ordinary skill in the art will recognize that this description may interchangeably refer to a communication network 200 wherein a first UFP device 202 connected to a first DisplayPort source device 201 is paired with a first DFP device 208 connected to a first DisplayPort sink device 214, and that the set of method steps 606 causes the first DFP device 208 to switch its pairing to a second UFP device 204 that is connected to a second DisplayPort source device 203.

From terminal E (FIG. 6D), the method 600 proceeds to block 636, where the DFP device 106 receives a new pairing command from a controller device 206 to pair with a new UFP device 104 (such as the second UFP device 204) linked to a new DisplayPort source device 102 (such as the second DisplayPort source device 203). Next, at block 638, the DFP device 106 transmits placeholder DisplayPort data to the DisplayPort sink device 108 instead of DisplayPort data including the data from the original DisplayPort source device 102 (such as the first DisplayPort source device 201). As before, the placeholder DisplayPort data includes placeholder video data from the placeholder video engine 140, instead of the actual video data received from either the original DisplayPort source device or the new DisplayPort source device. The switch between the video data from the original DisplayPort source device and the placeholder video data may wait for a frame boundary, but is otherwise seamless, particularly when the placeholder video data has already been set to match the timing of the link between the DFP device 106 and the DisplayPort sink device 108.

At block 640, the DFP device 106 and the new UFP device 104 exchange link timing information. The new UFP device 104 would have already trained its link with its associated DisplayPort source device 102, and so the timing of that link would have already been established. This exchange of information is similar to the exchange described above in block 622. The method 600 then proceeds to decision block 642, where a determination is made based on whether the link between the DFP device 106 and the DisplayPort sink device 108 can support the timing of the data transferred between the DisplayPort source device 102 and the new UFP device 104 without performing link training. This determination is similar to the determination made in decision block 624, and so is not described in detail here for the sake of brevity. If the timing can be supported, then the result of decision block 642 is YES, and the method 600 proceeds to another decision block 646. If the timing cannot be supported without re-training the link between the DFP device 106 and the DisplayPort sink device 108, then the result of decision block 642 is NO, and the method proceeds to block 644, where the DFP device 106 and/or the new UFP device 104 retrains its link to a supported configuration. Again, this is similar to block 626, and so is not described in detail again here for the sake of brevity. The method 600 then proceeds to decision block 646.

At decision block 646, a determination is made regarding whether the timing of the link between the DFP device 106 and the DisplayPort sink device 108 should be changed to support the video data transmitted by the new UFP device 104. This is similar to the determination made in decision block 628, and so is not described in detail here so as to avoid unnecessary repetition. If the timing should be changed, then the result of decision block 646 is YES, and the method 600 proceeds to block 648. At block 648, the DFP device 106 changes a timing configuration for the link between the DFP device 106 and the DisplayPort sink device 108 to match a timing configuration of the link between the new UFP device 104 and the new DisplayPort source device 102 without re-training the link between the DFP device 106 and the DisplayPort sink device 108. As in block 630, changing the timing configuration may include sending five DisplayPort idle patterns before sending the new timing information and the new video stream, and may include changing the timing of the placeholder video data to the new timing, and transmitting DisplayPort data including the new placeholder video data after the five idle patterns. As also described in block 630, the new timing information may be identical to the timing of the video data received from the UFP device 104, or may be changed to a configuration that is not identical but for which the DFP device 106 can alter the received video data to match. The method 600 then proceeds to block 650. If the timing did not have to be changed, then the result of decision block 646 is NO, and the method 600 proceeds directly from decision block 646 to block 650.

At block 650, the new UFP device 104 transmits data from the new DisplayPort source device 102 to the DFP device 106. Next, at block 652, the DFP device 106 transmits DisplayPort data including the data from the new DisplayPort source device 102 to the DisplayPort sink device 108 instead of the placeholder DisplayPort data. In some embodiments, the DFP device 106 may switch directly from the video from the original DisplayPort source device/ UFP device to the video from the new DisplayPort source device/UFP device, but transmitting the placeholder DisplayPort data in between may help compensate for any delays in receiving the new stream.

At this point in the method 600, the video displayed by the DisplayPort sink device 108 has switched from that provided by the first DisplayPort source device to that provided by the second DisplayPort source device. Though placeholder data may be presented in between the two videos, the switch from the first video to the second video should otherwise occur seamlessly, particularly in situations where link training does not have to be repeated to switch between videos. The method 600 then proceeds to terminal F, and from terminal F (FIG. 6A) to an end block where the method 600 terminates.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of switching DisplayPort connections over an extension medium, the method comprising:
   conducting, by an extension device, link training with a DisplayPort sink device to establish a DisplayPort link between the extension device and the DisplayPort sink device;

generating, by the extension device, placeholder video data;

generating, by the extension device, DisplayPort data that includes the placeholder video data;

transmitting, by the extension device, the DisplayPort data that includes the placeholder video data to the DisplayPort sink device;

receiving, by the extension device via the extension medium, actual video data, wherein the actual video data is generated by a DisplayPort source device;

generating, by the extension device, DisplayPort data that includes the actual video data; and transmitting, by the extension device, the DisplayPort data that includes the actual video data to the DisplayPort sink device without re-training the link between the extension device and the DisplayPort sink device.

2. The method of claim 1, wherein the placeholder video data and the actual video data have matching timing.

3. The method of claim 1, wherein timing of the actual video data and timing of the placeholder video data is different, and wherein the method further comprises:

generating, by the extension device, DisplayPort data that includes at least five idle patterns; and transmitting, by the extension device, the DisplayPort data that includes at least five idle patterns between the DisplayPort data that includes the placeholder video data and the DisplayPort data that includes the actual video data.

4. The method of claim 1, wherein the actual video data is first actual video data received from a first extension device connected to a first DisplayPort source device, and wherein the method further comprises:

receiving, by the extension device, a command to pair to a second extension device connected to a second DisplayPort source device;

receiving, by the extension device via the extension medium, second actual video data from the second extension device;

generating, by the extension device, DisplayPort data that includes the second actual video data instead of the first actual video data; and transmitting, by the extension device, the DisplayPort data that includes the second actual video data instead of the first actual video data to the DisplayPort sink device without re-training the link between the extension device and the DisplayPort sink device.

* * * * *